US012693410B2

(12) United States Patent
Takezaki et al.

(10) Patent No.: US 12,693,410 B2
(45) Date of Patent: Jul. 28, 2026

(54) RADAR IMAGE SYNTHESIZING DEVICE, RADAR IMAGE SYNTHESIZING METHOD, AND NON-TRANSITORY COMPUTER-READABLE RECORDING MEDIUM

(71) Applicant: Furuno Electric Co., Ltd., Nishinomiya-City (JP)

(72) Inventors: Ayano Takezaki, Nishinomiya (JP); Yoshifumi Ohnishi, Nishinomiya (JP); Fumiya Nakatani, Osaka (JP); Masaki Sakamoto, Nishinomiya (JP)

(73) Assignee: FURUNO ELECTRIC CO., LTD., Nishinomiya-City (JP)

( * ) Notice: Subject to any disclaimer, the term of this patent is extended or adjusted under 35 U.S.C. 154(b) by 246 days.

(21) Appl. No.: 18/648,743

(22) Filed: Apr. 29, 2024

(65) Prior Publication Data

US 2024/0280690 A1 Aug. 22, 2024

Related U.S. Application Data

(63) Continuation-in-part of application No. PCT/JP2022/014832, filed on Mar. 28, 2022.

(30) Foreign Application Priority Data

Oct. 29, 2021 (JP) ................................. 2021-177854

(51) Int. Cl.
*G01S 13/90* (2006.01)

(52) U.S. Cl.
CPC ...... *G01S 13/9021* (2019.05); *G01S 13/9058* (2019.05)

(58) Field of Classification Search
CPC ........ G01S 13/937; G01S 13/89; G01S 13/87; G01S 13/956

(Continued)

(56) References Cited

U.S. PATENT DOCUMENTS 3,860,923 A * 1/1975 Yamanaka ............ G01S 13/931
342/107
4,143,370 A * 3/1979 Yamanaka ............ G01S 13/931
342/107

(Continued)

FOREIGN PATENT DOCUMENTS

CN 107271970 A 10/2017
JP 2006-300722 A 11/2006

(Continued)

OTHER PUBLICATIONS

International Search Report and Written Opinion mailed on Jun. 7, 2022, received for PCT Application PCT/JP2022/014832, filed on Mar. 28, 2022, 8 pages including English Translation.

*Primary Examiner* — Michael W Justice

(74) *Attorney, Agent, or Firm* — XSENSUS LLP

(57) ABSTRACT

A radar image synthesizing device capable of displaying a synthesized image with higher visual recognition based on a plurality of radar images is provided. The radar image synthesizing device includes processing circuitry. The processing circuitry acquires a plurality of radar images based on a measuring result of each of a plurality of radars disposed at different locations. The processing circuitry generates a synthesized image in which the plurality of radar images are synthesized, while using a position at which a product of a beam width of the radar and a distance from the radar becomes equal in a set of at least any two radars, as a boundary between the radar images. The processing circuitry displays the synthesized image.

15 Claims, 9 Drawing Sheets

(58) Field of Classification Search
USPC ................................ 342/179, 176, 41, 26 R
See application file for complete search history.

(56) References Cited

U.S. PATENT DOCUMENTS

| | | | | |
|---|---|---|---|---|
| 4,283,725 | A * | 8/1981 | Chisholm | G01S 7/40 342/26 B |
| 4,533,916 | A * | 8/1985 | Williams | G01S 13/685 342/80 |
| 4,716,298 | A * | 12/1987 | Etoh | G01S 17/931 250/559.38 |
| 4,894,658 | A * | 1/1990 | Hecht-Nielsen | G01S 13/89 342/191 |
| 5,515,287 | A * | 5/1996 | Hakoyama | G01S 13/937 701/400 |
| 5,959,571 | A * | 9/1999 | Aoyagi | G01S 13/325 342/146 |
| 6,204,799 | B1 * | 3/2001 | Caputi, Jr. | G01S 13/904 342/25 R |
| 6,246,359 | B1 * | 6/2001 | Asano | G01S 13/584 342/158 |
| 6,335,700 | B1 * | 1/2002 | Ashihara | G01S 7/4004 342/117 |
| 6,441,773 | B1 * | 8/2002 | Kelly | G01S 13/951 342/52 |
| 6,738,009 | B1 * | 5/2004 | Tsunoda | G01S 13/904 342/191 |
| 7,079,157 | B2 * | 7/2006 | Deering | G06T 5/94 345/1.3 |
| 7,148,861 | B2 * | 12/2006 | Yelton | G06T 15/205 345/418 |
| 7,463,185 | B2 * | 12/2008 | Nakanishi | G01S 3/20 342/158 |
| 7,642,953 | B2 * | 1/2010 | Cheng | G01S 13/89 342/179 |
| 8,487,807 | B2 * | 7/2013 | Bergeron | G01S 13/9005 342/25 C |
| 8,854,448 | B2 * | 10/2014 | Tsujimoto | H04N 7/18 348/79 |
| 9,047,779 | B2 * | 6/2015 | Inoue | G01S 15/931 |
| 9,075,145 | B2 | 7/2015 | Reiter | |
| 9,562,778 | B2 * | 2/2017 | DuHadway | G01S 19/45 |
| 9,869,761 | B2 * | 1/2018 | Yoshimura | G01S 13/345 |
| 10,054,679 | B2 * | 8/2018 | Shibata | G01S 13/426 |
| 10,101,446 | B2 * | 10/2018 | Liu | G01S 13/91 |
| 10,173,623 | B1 * | 1/2019 | Meksavan | G01S 13/87 |
| 10,326,935 | B1 * | 6/2019 | Tsai | H04N 7/183 |
| 10,634,813 | B2 * | 4/2020 | Kare | G01S 7/006 |
| 10,677,891 | B2 * | 6/2020 | Rudzinsky | G01S 13/605 |
| 10,684,353 | B2 * | 6/2020 | Kusters, Jr. | G01S 7/24 |
| 10,914,836 | B2 * | 2/2021 | Lee | G01S 13/931 |
| 10,970,915 | B2 * | 4/2021 | Hanamoto | G06T 15/205 |
| 11,041,958 | B2 * | 6/2021 | Li | G01S 13/862 |
| 11,073,390 | B2 * | 7/2021 | Lee | G01C 15/002 |
| 11,436,927 | B2 * | 9/2022 | Derginer | G01S 13/937 |
| 11,443,637 | B2 * | 9/2022 | Malouf | G01S 7/53 |
| 11,762,085 | B2 * | 9/2023 | Steiner | G01S 13/42 342/145 |
| 11,774,573 | B2 * | 10/2023 | Le | G01S 13/588 342/106 |
| 12,320,892 | B2 * | 6/2025 | Fujiwara | G01S 15/42 |
| 12,500,662 | B2 * | 12/2025 | Miller | H04B 7/1851 |
| 2002/0008697 | A1 * | 1/2002 | Deering | G06T 5/80 345/418 |
| 2004/0169617 | A1 * | 9/2004 | Yelton | G06T 15/005 345/1.1 |
| 2007/0018888 | A1 | 1/2007 | Fujikawa et al. | |
| 2008/0088497 | A1 * | 4/2008 | Nakanishi | G01S 13/42 342/158 |
| 2009/0021423 | A1 * | 1/2009 | Cheng | G01S 13/89 342/25 A |
| 2010/0245065 | A1 * | 9/2010 | Harada | G01S 15/003 340/435 |
| 2012/0229331 | A1 * | 9/2012 | Bergeron | G01S 13/9005 342/25 C |
| 2012/0310504 | A1 * | 12/2012 | DuHadway | G01C 21/28 701/445 |
| 2012/0327239 | A1 * | 12/2012 | Inoue | G08G 1/165 348/148 |
| 2013/0271593 | A1 * | 10/2013 | Tsujimoto | G02B 21/36 345/589 |
| 2014/0368632 | A1 * | 12/2014 | Tsujimoto | G09G 5/02 348/79 |
| 2015/0204971 | A1 * | 7/2015 | Yoshimura | G01S 13/584 342/146 |
| 2016/0187479 | A1 * | 6/2016 | Shibata | G01S 13/325 342/59 |
| 2017/0067991 | A1 * | 3/2017 | Liu | G01S 13/87 |
| 2018/0038694 | A1 * | 2/2018 | Bruemmer | G01C 21/005 |
| 2018/0081028 | A1 * | 3/2018 | Kusters, Jr. | G01S 13/937 |
| 2018/0081054 | A1 * | 3/2018 | Rudzinsky | G01S 13/605 |
| 2018/0131449 | A1 * | 5/2018 | Kare | H02J 50/10 |
| 2019/0079177 | A1 * | 3/2019 | Lee | G01S 13/422 |
| 2019/0191084 | A1 * | 6/2019 | Tsai | H04N 23/667 |
| 2020/0033124 | A1 * | 1/2020 | Lee | G01S 13/931 |
| 2020/0033859 | A1 * | 1/2020 | Xiao | G01S 7/4817 |
| 2020/0064483 | A1 * | 2/2020 | Li | G01S 13/867 |
| 2020/0160725 | A1 * | 5/2020 | Derginer | B63H 25/04 |
| 2020/0160726 | A1 * | 5/2020 | Malouf | G05D 1/0206 |
| 2020/0216152 | A1 * | 7/2020 | Mizuno | G01S 13/862 |
| 2020/0241165 | A1 * | 7/2020 | Kare | H01S 5/005 |
| 2021/0026006 | A1 * | 1/2021 | Steiner | G01S 13/42 |
| 2021/0109207 | A1 * | 4/2021 | Le | G01S 13/34 |
| 2021/0318444 | A1 * | 10/2021 | Li | G01S 7/4034 |
| 2022/0405519 | A1 * | 12/2022 | Guzik | G06V 10/141 |
| 2022/0413433 | A1 * | 12/2022 | Parra Pozo | G06T 7/194 |
| 2023/0143433 | A1 * | 5/2023 | Chen | G06T 7/70 |
| 2023/0412252 | A1 * | 12/2023 | Miller | H04B 7/1851 |
| 2024/0053467 | A1 * | 2/2024 | Dvorecki | G01S 13/931 |

FOREIGN PATENT DOCUMENTS

| | | |
|---|---|---|
| JP | 2007-212299 A | 8/2007 |
| JP | 2011-164056 A | 8/2011 |

* cited by examiner

RADAR IMAGE SYNTHESIZING DEVICE, RADAR IMAGE SYNTHESIZING METHOD, AND NON-TRANSITORY COMPUTER-READABLE RECORDING MEDIUM

CROSS-REFERENCE TO RELATED APPLICATION(S)

This application is a continuation-in-part application of PCT International Application No. PCT/JP2022/014832, which was filed on Mar. 28, 2022, and which claims priority to Japanese Patent Application No. JP2021-177854 filed on Oct. 29, 2021, the entire disclosures of each of which are herein incorporated by reference for all purposes.

TECHNICAL FIELD

The present disclosure relates to a radar image synthesizing device, a radar image synthesizing method, and a radar image synthesizing program.

BACKGROUND OF THE DISCLOSURE

Conventionally, in order to eliminate a dead angle of a field of view of a radar mounted on a ship, art in which a plurality of radars are mounted in different locations on the ship, and a plurality of radar images generated by the radars are displayed in a synthesized fashion is known. For example, U.S. Pat. No. 9,075,145B2 discloses art in which radar signals from two radars having different line-of-sight coverages are combined, and one radar image based on the combined radar signal is displayed.

However, in this conventional art, the synthesized image displayed based on the plurality of radar images may be low in the visual recognition. Overcoming such a problem of the conventional art, it is desirable to display a synthesized image based on the plurality of radar images, which is higher in the visual recognition.

SUMMARY OF THE DISCLOSURE

The present disclosure is made in order to solve the above-described problem, and one purpose thereof is to provide a radar image synthesizing device, a radar image synthesizing method, and a radar image synthesizing program, capable of displaying a synthesized image based on a plurality of radar images, which is higher in visual recognition.

(1) In order to solve the above-described problem, a radar image synthetizing device according to one aspect of the present disclosure includes an acquirer, a generator, and a display processor. The acquirer acquires a plurality of radar images based on a measuring result of each of a plurality of radars disposed at different locations. The generator generates a synthesized image in which the plurality of radar images are synthesized, while using a position at which a product of a beam width of the radar and a distance from the radar becomes equal in a set of at least any two radars, as a boundary between the radar images. The display processor displays the synthesized image.

By displaying the synthesized image in which the radar images are synthesized while using the position at which the product of the beam width of the radar and the distance from the radar becomes equal in the set of radars, as the boundary of the radar images, the size of the target object displayed in one radar image and the size of the target object displayed in the other radar image are equal to each other, even if the target object is displayed over the boundary between the radar images in the synthesized image. Thus, it can display the synthesized image without a discontinuous part at the boundary between the radar images. Therefore, it can display the synthesized image with higher visual recognition based on the plurality of radar images.

(2) The radar image synthetizing device may further include an accepter which accepts parameters indicative of a position of each of the radars, and a beam width of each of the radars.

According to this configuration, the synthesized image can be generated by calculating a position suitable for the boundary between the radar images based on the accepted positions and beam widths of the radars.

(3) The display processor may display the synthesized image further including a line of the boundary.

According to this configuration, it can display the synthesized image in which the boundary between the radar images can be recognized and which has higher convenience for a user.

(4) The display processor may display the synthesized image further including positional information on each of the radars.

According to this configuration, it can display the synthesized image in which the position of each radar can be recognized and which has higher convenience for a user.

(5) The plurality of radars may be mounted on a ship.

According to this configuration, it can display the synthesized image with higher visual recognition in which the plurality of radar images acquired in the ship are synthesized.

(6) The plurality of radars may be a radar disposed at the bow side of the ship, and a radar disposed at the stern side of the ship.

According to this configuration, it can display the synthesized image with higher visual recognition in which the bow-side radar image and the stern-side radar image are synthesized.

(7) The plurality of radars may be a radar disposed at the bow side of the ship, a radar disposed at the stern side of the ship, a radar disposed at the port side of the ship, and a radar disposed at the starboard side of the ship.

According to this configuration, it can display the synthesized image with higher visual recognition in which the bow-side radar image, the stern-side radar image, the port-side radar image, and the starboard-side radar image are synthesized.

(8) The set of radars may include a set of the radar disposed at the bow side of the ship, and the radar disposed at the port side of the ship, a set of the radar disposed at the bow side of the ship, and the radar disposed at the starboard side of the ship, a set of the radar disposed at the stern side of the ship, and the radar disposed at the port side of the ship, a set of the radar disposed at the stern side of the ship, and the radar disposed at the starboard side of the ship, and a set of the radar disposed at the port side of the ship, and the radar disposed at the starboard side of the ship.

According to this configuration, it can display the synthesized image in which the four radar images around the ship are efficiently synthesized.

(9) The display processor may display the synthesized image centering on a position of a bridge of the ship.

According to this configuration, it can display the synthesized image in a wider range in all directions centering on the position of the bridge of the ship.

(10) Further, a radar image synthetizing method according to another aspect of the present disclosure includes acquiring a plurality of radar images indicative of a measuring result of each of a plurality of radars disposed at different locations, generating a synthesized image in which the plurality of radar images are synthesized, while using a position at which a product of a beam width of the radar and a distance from the radar becomes equal in a set of at least any two radars, as a boundary between the radar images, and displaying the synthesized image.

By displaying the synthesized image in which the radar images are synthesized while using the position at which the product of the beam width of the radar and the distance from the radar becomes equal in the set of radars, as the boundary of the radar images, the size of the target object displayed in one radar image and the size of the target object displayed in the other radar image are equal to each other, even if the target object is displayed over the boundary between the radar images in the synthesized image. Thus, it can display the synthesized image without a discontinuous part at the boundary between the radar images. Therefore, it can display the synthesized image with higher visual recognition based on the plurality of radar images.

(11) Further, a non-transitory computer-readable recording medium storing a program according to another aspect of the present disclosure causes a computer to execute a processing which includes acquiring a plurality of radar images based on a measuring result of each of a plurality of radars disposed at different locations, generating a synthesized image in which the plurality of radar images are synthesized, while using a position at which a product of a beam width of the radar and a distance from the radar becomes equal in a set of at least any two radars, as a boundary between the radar images, and displaying the synthesized image.

By displaying the synthesized image in which the radar images are synthesized while using the position at which the product of the beam width of the radar and the distance from the radar becomes equal in the set of radars, as the boundary of the radar images, the size of the target object displayed in one radar image and the size of the target object displayed in the other radar image are equal to each other, even if the target object is displayed over the boundary between the radar images in the synthesized image. Thus, it can display the synthesized image without a discontinuous part at the boundary between the radar images. Therefore, it can display the synthesized image with higher visual recognition based on the plurality of radar images.

According to the present disclosure, it is possible to display the synthesized image based on the plurality of radar images, which is higher in visual recognition.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION OF THE DISCLOSURE

Figure 1:
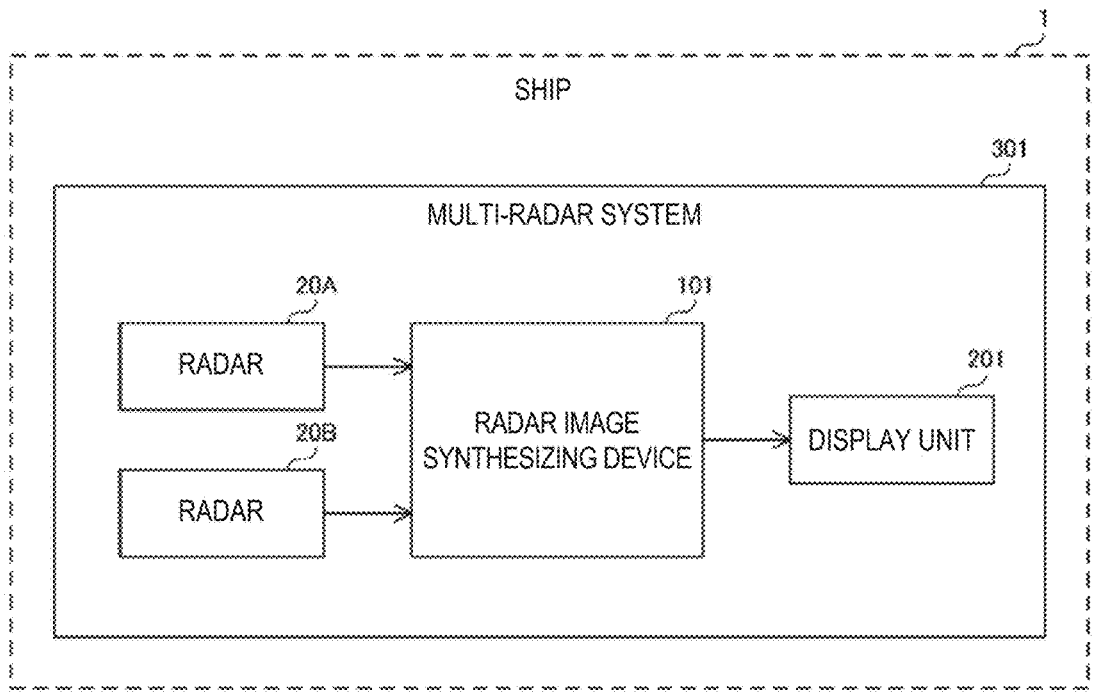
FIG. 1 is a view illustrating a configuration of a multi-radar system according to one embodiment of the present disclosure.

Hereinafter, one embodiment of the present disclosure is described with reference to the accompanying drawings. Note that the same reference characters are given to the same or corresponding parts in the drawings not to repeat the same explanations. Further, at least some parts of the embodiment described below may be combined arbitrarily.

[Configuration and Basic Operation]

<Multi-Radar System>

FIG. 1 is a view illustrating a configuration of a multi-radar system according to one embodiment of the present disclosure. Referring to FIG. 1, a multi-radar system 301 may include a plurality of radars 20, a radar image synthesizing device 101, and a display unit 201. The multi-radar system 301 may be mounted on a ship 1. Below, the width direction of the ship 1 is X-direction, the longitudinal direction of the ship 1 is the Y-direction, and the vertical direction is the Z-direction.

For example, the multi-radar system 301 may be provided with radars 20A and 20B disposed at different locations, as the radars 20. The radar 20A may be mounted on the bow side of the ship 1. The radar 20B may be mounted on the stern side of the ship 1. The radar 20 may be a millimeter wave radar, for example. The radar 20 may be an FM-CW (Frequency Modulated Continuous Wave) radar, or may be a pulse radar, or may be other radars.

The radar 20 may include an antenna (not illustrated). The radar 20 may measure a distance to a target object S within a target area which is an area around the radar 20. The target area may be a circular area centering on the antenna, or may be a sector or fan-shaped area which is a part of the circle centering on the antenna.

In detail, the radar 20 may transmit via the antenna, for every given sweep period, a transmission signal of an RF (Radio Frequency) band having a given horizontal beam width to a divisional target area which is a part of the target area, and receive via the antenna a reflection signal which is obtained by the transmission signal being reflected on the target object S. The radar 20 may rotate the antenna so that the azimuth angle of the transmitting direction of the transmission signal is shifted by a given angle for every sweep period. The radar 20 may generate based on the received reflection signal, for every sweep period, echo data indicative of a measuring result of a distance to the target object S within the divisional target area, and then transmit the generated echo data to the radar image synthesizing device 101.

Figure 2:
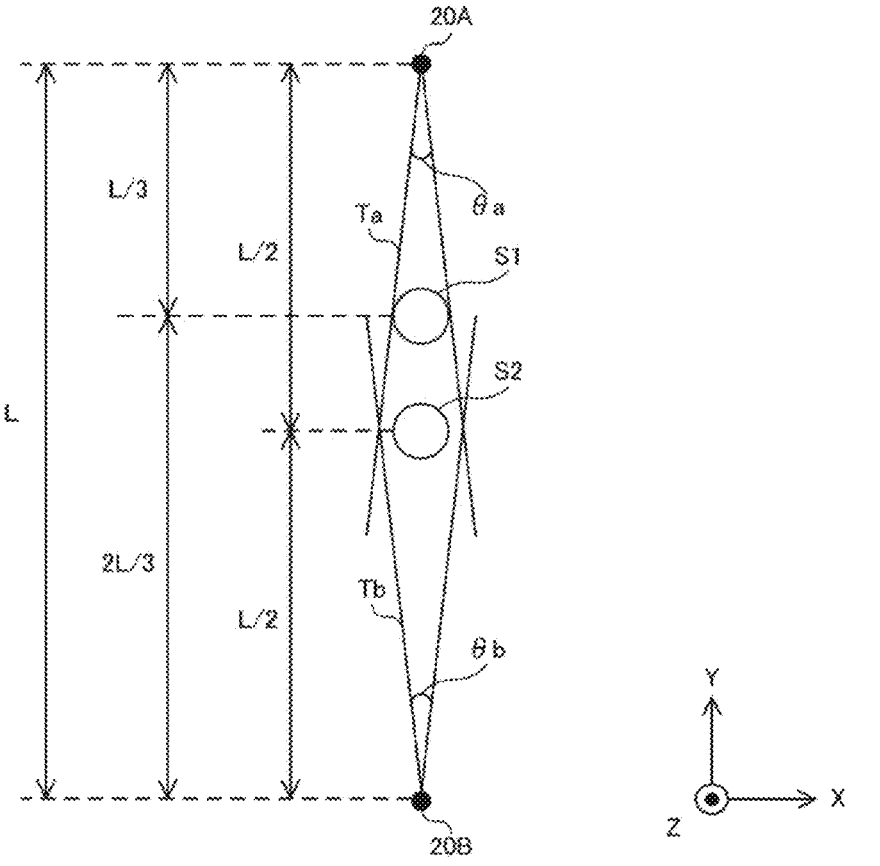
FIG. 2 is a view illustrating one example of an installed location of each radar in the multi-radar system according to the embodiment of the present disclosure.

FIG. 2 is a view illustrating one example of an installed location of each radar in the multi-radar system according to this embodiment of the present disclosure.

Referring to FIG. 2, the radars 20A and 20B may be lined up in the Y-direction. A radar-to-radar distance L which is a distance between the radar 20A and the radar 20B in the Y-direction may be several hundred meters, for example.

For example, target objects S1 and S2 which are the target objects S may exist between the radar 20A and the radar 20B. Here, in the Y-direction, the distance between the radar 20A and the target object S1 may be ⅓ of the radar-to-radar distance L, and the distance between the radar 20B and the target object S1 may be ⅔ of the radar-to-radar distance L. Further, here, in the Y-direction, the distance between the radar 20A and the target object S2 and the distance between the radar 20B and the target object S2 may be ½ of the radar-to-radar distance L.

For every sweep period Wa, the radar 20A may transmit a transmission signal Ta having a horizontal beam width θa via the antenna, receive the reflection signal via the antenna, and then generate the echo data and transmit it to the radar image synthesizing device 101.

For every sweep period Wb, the radar 20B may transmit a transmission signal Tb having a horizontal beam width θb via the antenna, receive the reflection signal via the antenna, and then generate the echo data and transmit it to the radar image synthesizing device 101.

The sweep period Wa and the sweep period Wb may be the same length, or may be different lengths. Further, the horizontal beam width θa and the horizontal beam width θb may be equal to each other, or may be different from each other. Further, the size of the target area of the radar 20A and the size of the target area of the radar 20B may be equal to each other, or may be different from each other.

The radar image synthesizing device 101 may receive the echo data from each radar 20, and generate a radar image for every radar 20 based on the received echo data. For example, this radar image may be an image indicative of a correspondence relationship between XY coordinates and an echo intensity indicated by the echo data. The radar image synthesizing device 101 may generate a synthesized image by synthesizing a plurality of radar images generated for every radar 20, and display the generated synthesized image on the display unit 201.

[Problems]

Meanwhile, in the conventional art, the synthesized image generated by synthesizing the plurality of radar images may be low in the visual recognition.

Figure 3:
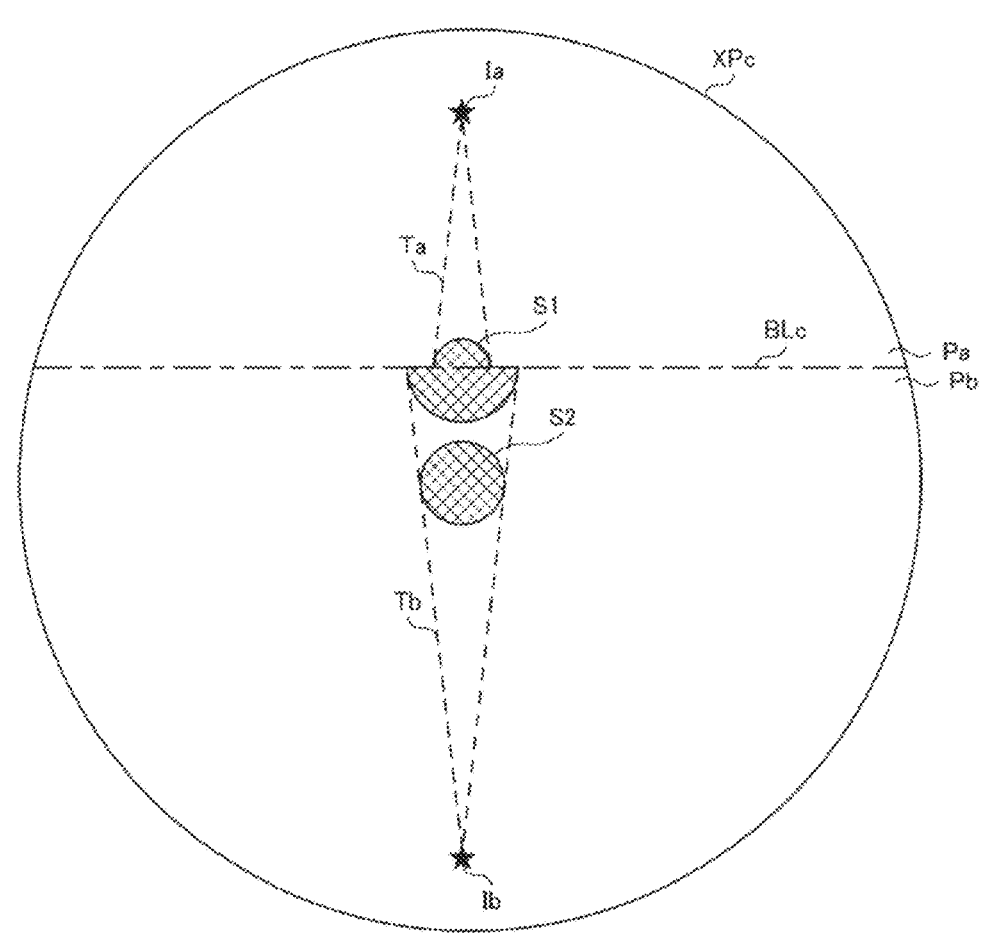
FIG. 3 is a view illustrating one example of a synthesized image generated by a radar image synthesizing device according to a comparative example of the present disclosure.

FIG. 3 is a view illustrating one example of a synthesized image generated by a radar image synthesizing device according to a comparative example of the present disclosure. FIG. 3 illustrates a synthesized image XPc including an icon Ia indicative of an installed location of the radar 20A, and an icon Ib indicative of an installed location of the radar 20B. In FIG. 3, the transmission signals Ta and Tb of the radars 20A and 20B are illustrated by broken lines, and a borderline BLc which is a line at a boundary between radar images Pa and Pb is illustrated by a one-dot chain line.

Referring to FIG. 3, the radar image synthesizing device according to the comparative example generates the synthesized image XPc by synthesizing the radar image Pa based on the echo data received from the radar 20A, and the radar image Pb based on the echo data received from the radar 20B. In detail, it generates the synthesized image XPc by trimming the radar images Pa and Pb, and synthesizing the trimmed radar images Pa and Pb.

Here, the horizontal beam width θa and the horizontal beam width θb are equal to each other, and the target object S1 is displayed over the borderline BLc in the synthesized image XPc. In this case, since the distance between the radar 20A and the target object S1 in the Y-direction is shorter than the distance between the radar 20B and the target object S1 in the Y-direction, the target object S1 displayed in the radar image Pa becomes smaller than the target object S1 displayed in the radar image Pb.

Therefore, the synthesized image XPc becomes a discontinuous image at the boundary between the radar image Pa and the radar image Pb to lower the visual recognition.

The multi-radar system 301 and the radar image synthesizing device 101 of the present disclosure solve the above-described problem by the following configurations.

<Radar Image Synthesizing Device>

Figure 4:
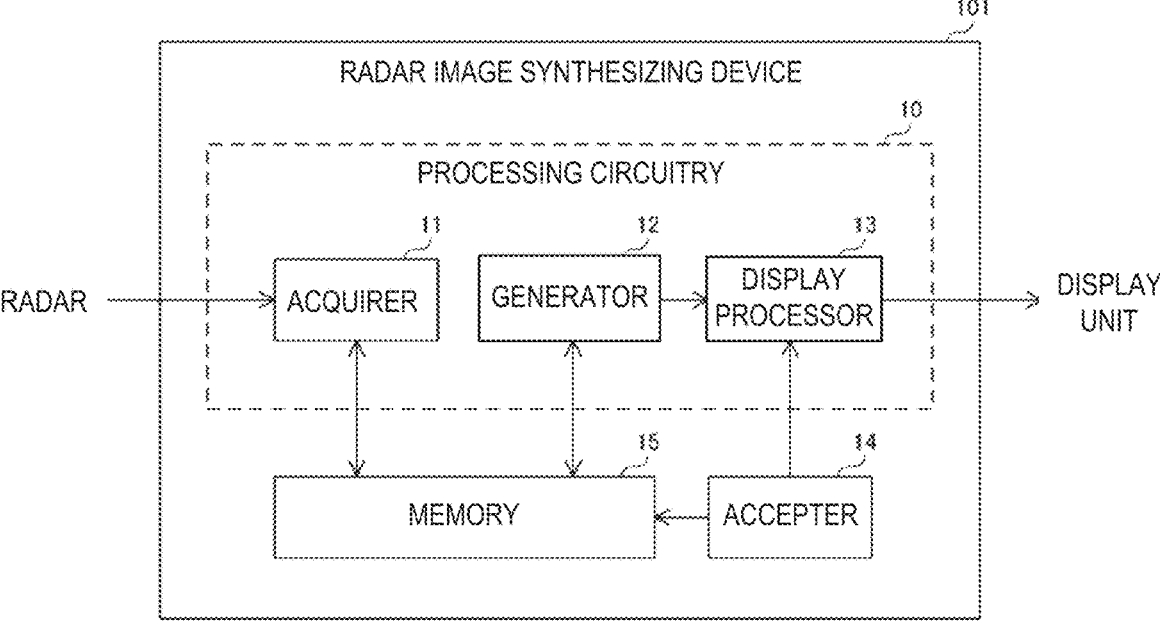
FIG. 4 is a view illustrating a configuration of a radar image synthesizing device according to the embodiment of the present disclosure.

FIG. 4 is a view illustrating a configuration of the radar image synthesizing device according to the embodiment of the present disclosure. Referring to FIG. 4, the radar image synthesizing device 101 may include a controller 10, an accepter 14, and a memory 15. The controller 10 may include an acquirer 11, a generator 12, and a display processor 13. The controller 10 may be a processing circuitry, for example.

(Acquisition of Parameter Information)

The acceptor 14 may accept parameter information indicative of the position of each radar 20 in the multi-radar system 301, and the beam width of each radar 20.

In more detail, the accepter 14 may accept operation for performing an initial setup by a user of the radar image synthesizing device 101, when the radar 20 is mounted on the ship 1. The acceptor 14 may output operational information indicative of the accepted operation to the display processor 13.

Figure 5:
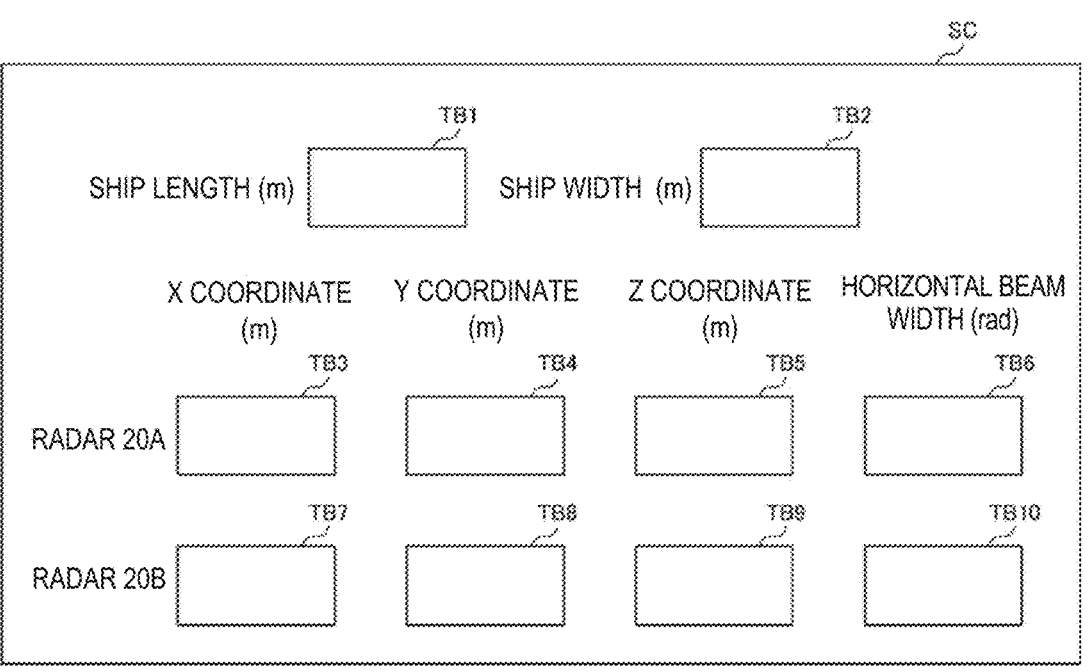
FIG. 5 is a view illustrating one example of a setup screen displayed on a display unit in the multi-radar system according to the embodiment of the present disclosure.

FIG. 5 is a view illustrating one example of a setup screen displayed on the display unit in the multi-radar system according to the embodiment of the present disclosure.

Referring to FIG. 5, the display processor 13 may perform, in response to the operational information from the accepter 14, processing of displaying a setup screen SC on the display unit 201 according to the accepted operational information. The setup screen SC may include text boxes TB1-TB10.

The user of the radar image synthesizing device 101 may perform operation of inputting the parameter information, such as the position of each radar 20 and the horizontal beam width of each radar 20, into the text boxes TB1-TB10.

In more detail, the user may carry out operation of inputting a ship length of the ship 1 and a ship width of the ship 1 into the text boxes TB1 and TB2, respectively. The user may then perform operation of inputting an X coordinate, a Y coordinate, and a Z coordinate of the installed location of the radar 20A into the text boxes TB3-TB5, while using a given position of the ship 1 as the origin. The user may then perform operation of inputting the horizontal beam width θa of the radar 20A into the text box TB6. The user may then perform operation of inputting an X coordinate, a Y coordinate, and a Z coordinate of the installed location of the radar 20B into the text boxes TB7-TB9, while using the given position of the ship 1 as the origin. The user may then perform operation of inputting the horizontal beam width θb of the radar 20B into the text box TB10. For example, the given position of the ship 1 may be the center of the stern of the ship 1.

The acceptor 14 may store the parameter information inputted into the text boxes TB1-TB10 by the user of the radar image synthesizing device 101 in the memory 15.

Note that a manufacturer of the radar image synthesizing device 101 may perform the operation of inputting the parameter information into the text boxes TB1-TB10, instead of the user of the radar image synthesizing device 101.

(Acquisition of Radar Image)

Again referring to FIG. 4, the acquirer 11 may acquire a plurality of radar images based on the measuring results of the plurality of respective radars 20 disposed at different locations.

In more detail, the acquirer 11 may receive the echo data from each radar 20 in the multi-radar system 301, and store the received echo data in the memory 15 after it associates the echo data with the radar 20 which transmitted the echo data. The acquirer 11 may generate the plurality of radar images indicative of the measuring results of the plurality of respective radars 20 at a generation timing according to a given generation cycle, based on the echo data in the memory 15.

For example, the acquirer 11 may generate the radar image Pa indicative of the position of the target object S in the target area of the radar 20A based on the plurality of echo data received from the radar 20A. Further, the acquirer 11 may generate the radar image Pb indicative of the position of the target object S in the target area of the radar 20B based on the plurality of echo data received from the radar 20B. The acquirer 11 may store the generated radar images Pa and Pb in the memory 15.

(Generation and Display of Synthesized Image)

The generator 12 may generate the synthesized image XP in which the plurality of radar images are synthesized, while using a position at which the product of the beam width of the radar 20 and the distance from the radar 20 becomes equal for a set of at least any two of the radars 20, as the border between the radar images. In detail, the generator 12 may use the plurality of radar images Pa and Pb acquired by the acquirer 11 to generate the synthesized image XP in which the radar images Pa and Pb are synthesized, while using the position at which the product of the horizontal beam width of the radar 20 and the distance from the radar 20 becomes equal for the set of radars 20A and 20B, as the border between the radar images Pa and Pb.

In more detail, the generator 12 may calculate beforehand a balanced position Cab which is the position in the XY plane at which a product Va of the horizontal beam width θa of the radar 20A and the distance from the radar 20A becomes equal to a product Vb of the horizontal beam width θb of the radar 20B and the distance from the radar 20B, based on the parameter information stored in the memory 15 by the accepter 14. The generator 12 may store calculation information indicative of the calculated balanced position Cab in the memory 15.

The generator 12 may acquire the radar images Pa and Pb and the calculation information from the memory 15, each time the radar images Pa and Pb are stored in the memory 15 by the acquirer 11, and then generate the synthesized image XP by synthesizing the radar images Pa and Pb so that the balanced position Cab indicated by the calculation information becomes the boundary between the radar images Pa and Pb.

When the synthesized image XP is generated, the generator 12 may output image information indicative of the generated synthesized image XP to the display processor 13. Note that, the generator 12 may perform signal processing, such as the echo average (EAV) and the echo trail, to the generated synthesized image XP, and may output image information indicative of the synthesized image XP after the signal processing to the display processor 13.

The display processor 13 may perform processing of displaying the synthesized image XP generated by the generator 12.

Note that the radar image synthesizing device 101 may have a function to perform a user manual mode in which the radar image is synthesized and displayed so that a synthesizing position determined by the user becomes the boundary between the radar images. In more detail, the accepter 14 may accept the synthesizing position determined by the user, and store synthesizing positional information indicative of the accepted synthesizing position in the memory 15. The generator 12 may generate the synthesized image XP by synthesizing the radar images so that the synthesizing position indicated by the synthesizing positional information in the memory 15 becomes the boundary between the radar images, in a state where the user manual mode is turned ON.

(Example Display 1 of Synthesized Image)

For example, the horizontal beam width θa and the horizontal beam width θb may be equal to each other. In this case, the balanced position Cab calculated by the generator 12 may indicate a straight line which passes through a middle point of a line segment which connects the radar 20A with the radar 20B, and intersects perpendicularly with this line segment.

Figure 6:
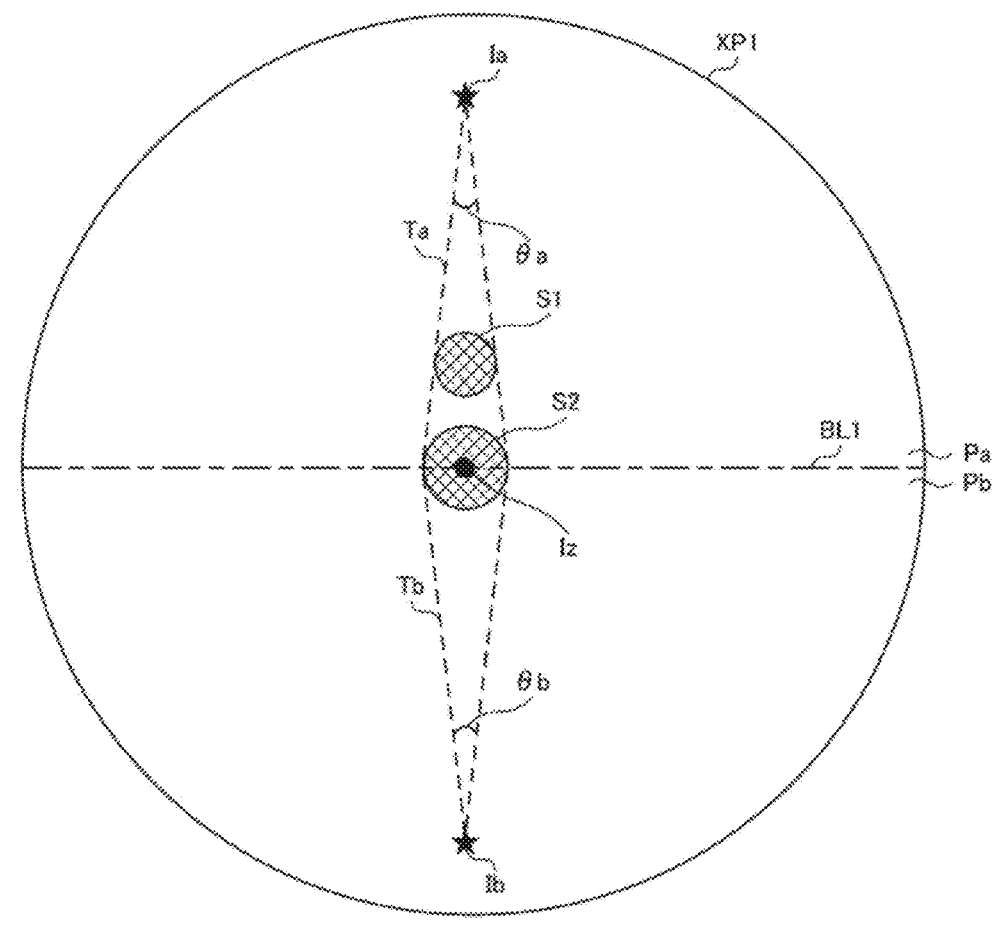
FIG. 6 is a view illustrating one example of a synthesized image generated by the radar image synthesizing device according to the embodiment of the present disclosure.

FIG. 6 is a view illustrating one example of the synthesized image generated by the radar image synthesizing device according to the embodiment of the present disclosure. FIG. 6 illustrates a synthesized image XP1 which is one example of the synthesized image XP generated by the generator 12. In FIG. 6, the transmission signals Ta and Tb of the radars 20A and 20B are illustrated by broken lines, and a borderline BL1 which is a line of the boundary between the radar images Pa and Pb in the synthesized image XP1 is illustrated by a one-dot chain line.

Referring to FIG. 6, the generator 12 may generate the synthesized image XP1 by acquiring the radar images Pa and Pb and the calculation information from the memory 15, and synthesizing the radar images Pa and Pb so that the balanced position Cab indicated by the calculation information becomes the boundary between the radar images Pa and Pb.

In more detail, the generator 12 may remove, by trimming, a part of the radar image Pa acquired from the memory 15 on the radar 20B side of the balanced position Cab indicated by the calculation information. Further, the generator 12 may remove, by trimming, a part of the radar image Pb acquired from the memory 15 on the radar 20A side of the balanced position Cab indicated by the calculation information. The generator 12 may then generate the synthesized image XP1 by synthesizing the trimmed radar images Pa and Pb.

For example, the generator 12 may generate the synthesized image XP1 including the icon Ia indicative of the installed location of the radar 20A, the icon Ib indicative of the installed location of the radar 20B, an icon Iz indicative of the position of the bridge of the ship 1, and the borderline BL1. The icons Ia and Ib are examples of positional information on the radars 20A and 20B, respectively.

For example, the generator 12 may generate the synthesized image XP1 centering on the position of the bridge of the ship 1. The bridge of the ship 1 may be a CCRP (Consistent Common Reference Point), for example. Note that the generator 12 may generate the synthesized image XP1 centering on a position obtained by adding a given offset according to the installed location of each radar 20 to the position of the bridge of the ship 1.

The generator 12 may output image information indicative of the generated synthesized image XP1 to the display processor 13.

For example, the display processor 13 may perform processing of displaying the synthesized image XP1 which includes the borderline BL1, and the icons Ia and Ib, and centers on the position of the bridge of the ship 1. In more detail, in response to the image information from the generator 12, the display processor 13 may carry out processing of displaying on the display unit 201 the synthesized image XP1 indicated by the received image information.

Thus, by synthesizing the radar images Pa and Pb so that the balanced position Cab becomes the boundary between the radar images Pa and Pb to generate the synthesized image XP1, the size of the target object S2 displayed in the radar image Pa and the size of the target object S2 displayed in the radar image Pb may be equal to each other, even if the target object S2 is displayed over the borderline BL1. Therefore, since the synthesized image XP1 does not have a discontinuous part at the boundary between the radar image Pa and the radar image Pb, it is high in the visual recognition.

(Example Display 2 of Synthesized Image)

For example, the horizontal beam width θa may be twice the horizontal beam width θb. In this case, the balanced position Cab may indicate a straight line which passes through a point which divides internally to 1:2 the line segment which connects the radar 20A with the radar 20B, and intersects perpendicularly with this line segment.

Figure 7:
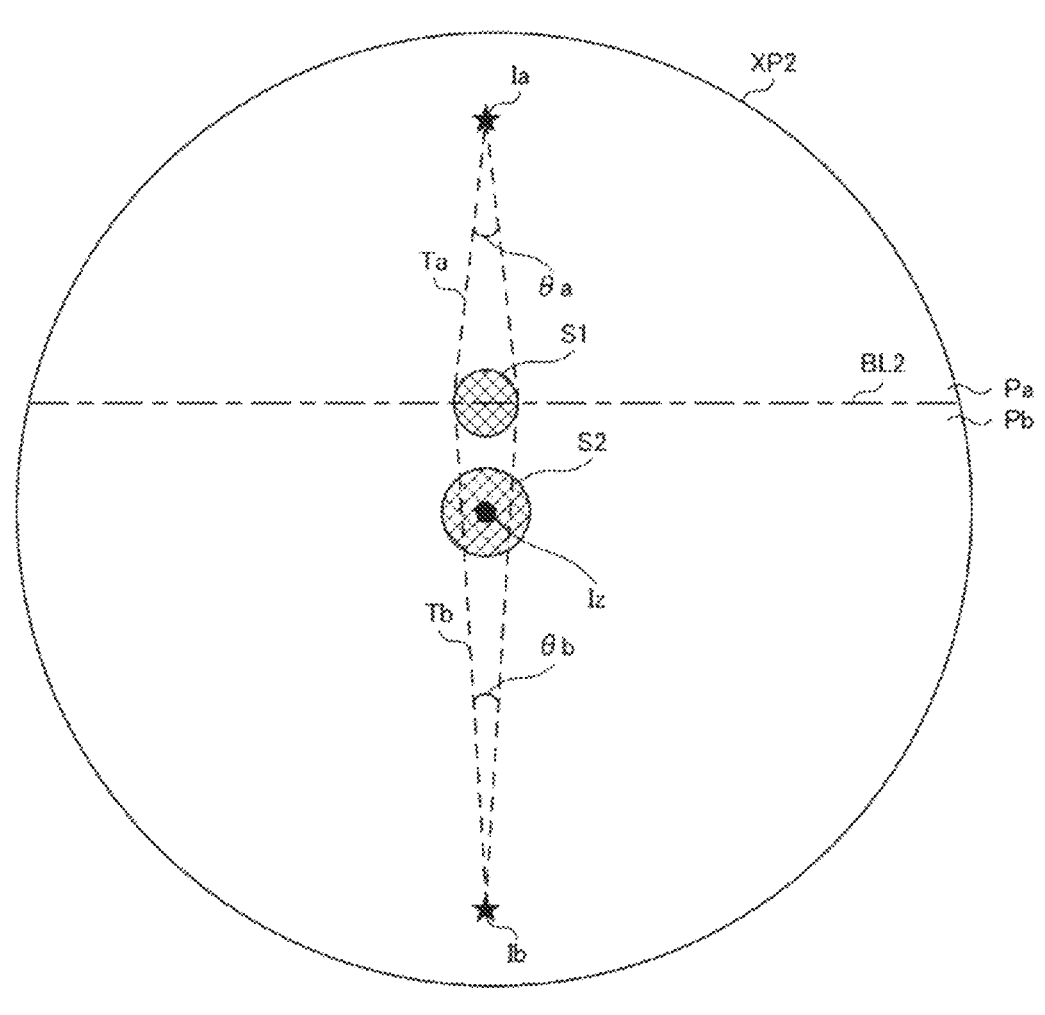
FIG. 7 is a view illustrating another example of the synthesized image generated by the radar image synthesizing device according to the embodiment of the present disclosure.

FIG. 7 is a view illustrating another example of the synthesized image generated by the radar image synthesizing device according to the embodiment of the present disclosure. FIG. 7 illustrates a synthesized image XP2 which is one example of the synthesized image XP generated by the generator 12. In FIG. 7, the transmission signals Ta and Tb of the radars 20A and 20B are illustrated by broken lines, and a borderline BL2 which is a line of the boundary between the radar images Pa and Pb in the synthesized image XP2 is illustrated by a one-dot chain line.

Referring to FIG. 7, the generator 12 may generate the synthesized image XP2 by acquiring the radar images Pa and Pb and the calculation information from the memory 15, and synthesizing the radar images Pa and Pb so that the balanced position Cab indicated by the calculation information becomes the boundary between the radar images Pa and Pb.

For example, the generator 12 may generate the synthesized image XP2 including the icons Ia, Ib, and Iz, and the borderline BL2. For example, the generator 12 may generate the synthesized image XP2 centering on the position of the bridge of the ship 1. The generator 12 may output image information indicative of the generated synthesized image XP2 to the display processor 13.

The display processor 13 may perform, in response to the image information from the generator 12, processing of displaying on the display unit 201 the synthesized image XP2 indicated by the received image information.

Thus, by synthesizing the radar images Pa and Pb so that the balanced position Cab becomes the boundary between the radar images Pa and Pb to generate the synthesized image XP2, the size of the target object S1 displayed in the radar image Pa and the size of the target object S1 displayed in the radar image Pb may be equal to each other, even if the target object S1 is displayed over the borderline BL1. Therefore, since the synthesized image XP2 does not have a discontinuous part at the boundary between the radar image Pa and the radar image Pb, it is high in the visual recognition.

Note that, in the radar image synthesizing device 101 according to the embodiment of the present disclosure, although the generator 12 calculates the balanced position Cab, and generates the synthesized image XP by synthesizing the radar images Pa and Pb so that the calculated balanced position Cab becomes the boundary between the radar images Pa and Pb, it is not limited to this configuration. For example, the generator 12 may generate the synthesized image XP without calculating the balanced position Cab.

In this case, if the horizontal beam width θa is equal to the horizontal beam width θb, the generator 12 may identify, for every pixel of the synthesized image XP to be generated, a radar 20 nearest to XY coordinates corresponding to this pixel in the XY plane, extract a pixel corresponding to the XY coordinates from the radar image of the identified radar 20 as a target pixel, and generate the synthesized image XP which is constituted by a plurality of extracted target pixels. Note that, for the pixel corresponding to the XY coordinates at the middle of the radars 20A and 20B among the pixels of the synthesized image XP to be generated, the generator 12 may extract a pixel corresponding to the XY coordinates from the radar image of one of the radars 20 as the target pixel.

<Modifications>

Figure 8:
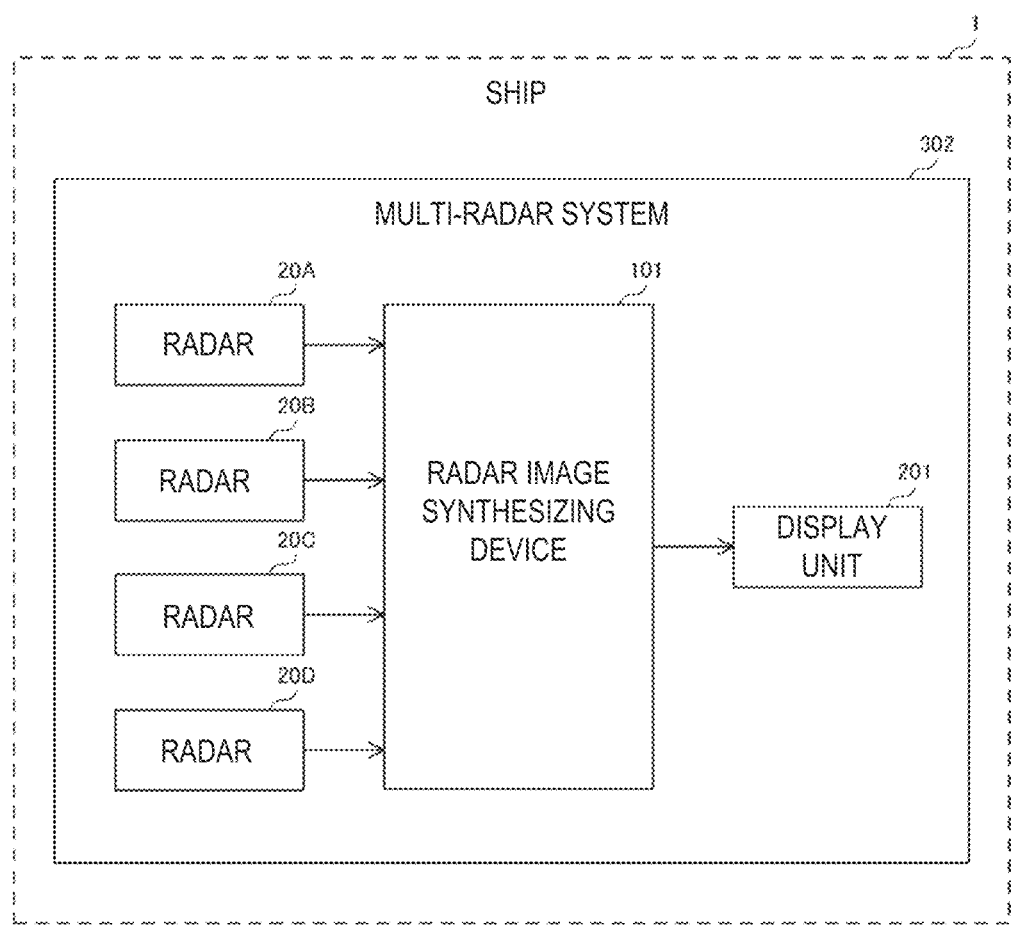
FIG. 8 is a view illustrating a configuration of a multi-radar system according to a modification of the embodiment of the present disclosure.

FIG. 8 is a view illustrating a configuration of a multi-radar system according to a modification of the embodiment of the present disclosure. Referring to FIG. 8, a multi-radar system 302 may be further provided with a radar 20C mounted on the port side of the ship 1, and a radar 20D mounted on the starboard side of the ship 1, as the radars 20, compared with the multi-radar system 301.

The radar 20C may transmit a transmission signal Tc having a horizontal beam width θc via an antenna for every sweep period Wc, receive a reflection signal via the antenna, generate echo data, and transmit it to the radar image synthesizing device 101.

The radar 20D may transmit a transmission signal Td having a horizontal beam width θd via an antenna for every sweep period Wd, receive a reflection signal via the antenna, generate echo data, and transmit it to the radar image synthesizing device 101.

Some or all of the sweep period Wa, the sweep period Wb, the sweep period Wc, and the sweep period Wd may be different in length, or all the periods may be the same in length. Further, for example, the horizontal beam width θa, the horizontal beam width θb, the horizontal beam width θc, and the horizontal beam width θd may be equal to each other.

The acquirer 11 in the radar image synthesizing device 101 may receive echo data from each radar 20 in the multi-radar system 302, and generate, for every radar 20, a radar image indicative of the measuring result of the radar 20 based on the echo data.

In more detail, the acquirer 11 may generate the radar image Pa indicative of the position of the target object S in the target area of the radar 20A based on a plurality of echo data received from the radar 20A. Further, the acquirer 11 may generate the radar image Pb indicative of the position of the target object S in the target area of the radar 20B based on a plurality of echo data received from the radar 20B. Further, the acquirer 11 may generate the radar image Pc indicative of the position of the target object S in the target area of the radar 20C based on a plurality of echo data received from the radar 20C. Further, the acquirer 11 may generate the radar image Pd indicative of the position of the target object S in the target area of the radar 20D based on a plurality of echo data received from the radar 20D.

The generator 12 may calculate based on the parameter information stored beforehand in the memory 15 by the accepter 14, a balanced position in the XY plane which is a position at which the product of a horizontal beam width of one of a pair of adjacent radars 20 and a distance from this radar 20 becomes equal to the product of a horizontal beam width of the other radar 20 and a distance from the other radar 20.

For example, the generator 12 may calculate a plurality of balanced positions by the following procedure. In this case, the generator 12 may select a radar group which is comprised of three arbitrary radars 20 among the four radars 20 in the multi-radar system 302, and calculate an equidistant point of the three radars 20 which constitute the selected radar group (i.e., a circumcenter).

Next, the generator 12 may discard the calculated circumcenter, if the radar 20 nearest to this circumcenter among the four radars 20 in the multi-radar system 302 is the radar 20 which does not constitute the selected radar group.

On the other hand, if the radar 20 nearest to the circumcenter among the four radars 20 in the multi-radar system 302 is in the three radars 20 which constitute the selected radar group, the generator 12 may determine to accept this circumcenter as a boundary point which is the boundary between the three radar images based on the measuring results of the three radars 20, and hold this circumcenter. Then, the generator 12 may calculate the balanced positions of all three combination pairs of radars 20 among the three radars 20 which constitute the selected radar group.

Next, the generator 12 may repeat the selection of the radar group and the calculation of the circumcenter until it selects all the combinations of the radars 20 as the radar group.

Below, a concrete example of the plurality of balanced positions calculated by the generator 12 is described with reference to the drawings.

Figure 9:
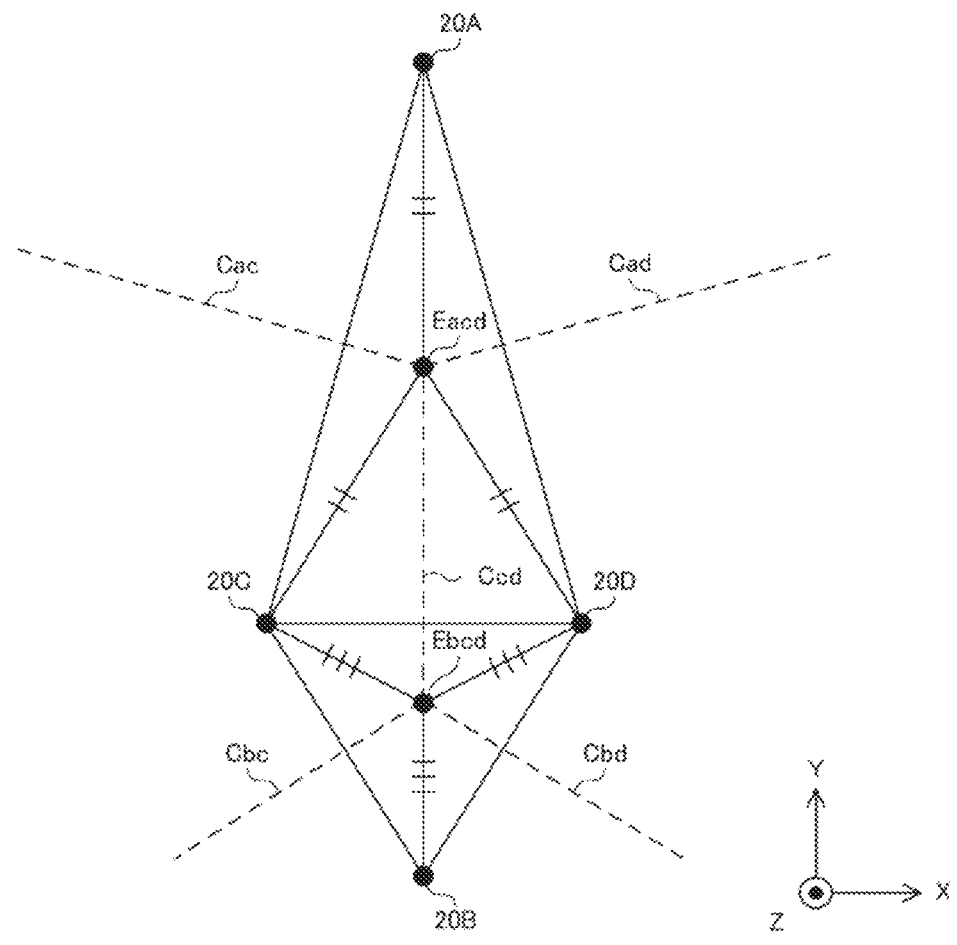
FIG. 9 is a view illustrating one example of an installed location of each radar in the multi-radar system according to the modification of the embodiment of the present disclosure.

FIG. 9 is a view illustrating one example of the installed location of each radar in the multi-radar system according to the modification of the embodiment of the present disclosure.

Referring to FIG. 9, the generator 12 may calculate a circumcenter Eacd of the radars 20A, 20C, and 20D. Then, the generator 12 may calculate, for the set of radars 20A and 20C, a balanced position Cac in the XY plane which is a position at which the product Va becomes equal to the product Vc of the horizontal beam width θc of the radar 20C and the distance from the radar 20C. Further, the generator 12 may calculate, for the set of radars 20A and 20D, a balanced position Cad in the XY plane which is a position at which the product Va becomes equal to the product Vd of the horizontal beam width θd of the radar 20D and the distance from the radar 20D. Further, the generator 12 may calculate, for the set of radars 20C and 20D, a balanced position Ccd in the XY plane which is a position at which the product Vc becomes equal to the product Vd.

The generator 12 may calculate a circumcenter Ebcd of the radars 20B, 20C, and 20D. Then, the generator 12 may calculate, for the set of radars 20B and 20C, a balanced position Cbc in the XY plane which is a position at which the product Vb becomes equal to the product Vc. Further, the generator 12 may calculate, for the set of radars 20B and 20D, a balanced position Cbd in the XY plane which is a position at which the product Vb becomes equal to Vd.

The balanced position Cac may be a half-line which intersects perpendicularly with a line segment which connects the radar 20A with the radar 20C, and extends from the circumcenter Eacd. The balanced position Cad may be a half-line which intersects perpendicularly with a line segment which connects the radar 20A with the radar 20D, and extends from the circumcenter Eacd. The balanced position Ccd may be a line segment which intersects perpendicularly with a line segment which connects the radar 20C with the radar 20D, and connects the circumcenter Eacd with the circumcenter Ebcd. The balanced position Cbc may be a half-line which intersects perpendicularly with a line segment which connects the radar 20B with the radar 20C, and extends from the circumcenter Ebcd. The balanced position Cbd may be a half-line which intersects perpendicularly with a line segment which connects the radar 20B with the radar 20D, and extends from the circumcenter Ebcd.

The generator 12 may store calculation information indicative of the calculated circumcenters Eacd and Ebcd, and the calculated balanced positions Cac, Cad, Cbc, and Cbd in the memory 15.

The generator 12 may acquire the radar images Pa, Pb, Pc, and Pd, and the calculation information from the memory 15, each time the radar images Pa, Pb, Pc, and Pd are stored in the memory 15 by the acquirer 11, and generate the synthesized image XP by synthesizing the radar images Pa, Pb, Pc, and Pd so that the balanced positions Cac, Cad, Cbc, and Cbd indicated by the calculation information become the boundary between the radar images Pa, Pb, Pc, and Pd.

When the generator 12 generates the synthesized image XP, it may output image information indicative of the generated synthesized image XP to the display processor 13.

Figure 10:
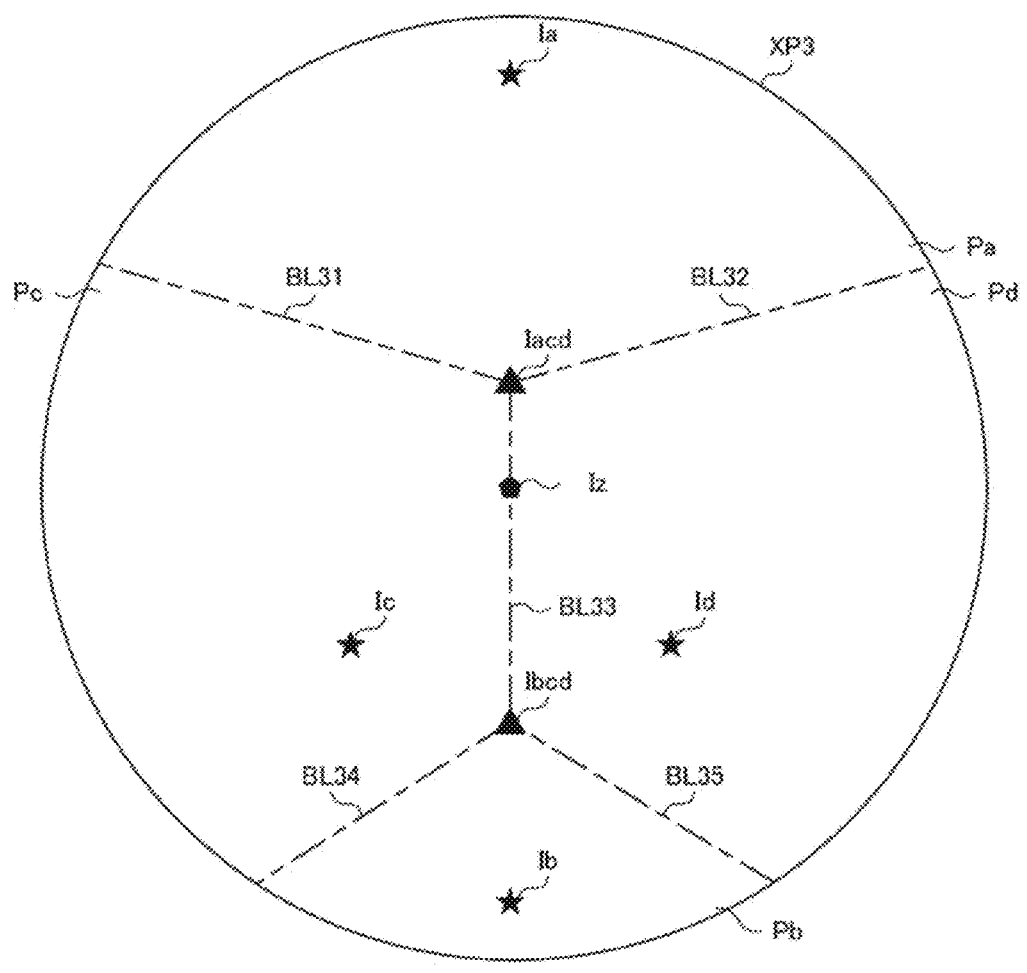
FIG. 10 is a view illustrating one example of a synthesized image generated by the radar image synthesizing device according to the modification of the embodiment of the present disclosure.

FIG. 10 is a view illustrating one example of the synthesized image generated by the radar image synthesizing device according to the modification of the embodiment of the present disclosure. FIG. 10 illustrates a synthesized image XP3 which is one example of the synthesized image XP generated by the generator 12. In FIG. 10, a borderline BL31 between the radar images Pa and Pc, a borderline BL32 between the radar images Pa and Pd, a borderline BL33 between the radar images Pc and Pd, a borderline BL34 between the radar images Pb and Pc, and a borderline BL35 between the radar images Pb and Pd are illustrated by one-dot chain lines in the synthesized image XP3.

Referring to FIG. 10, the generator 12 may generate the synthesized image XP3 by synthesizing the radar images Pa, Pb, Pc, and Pd so that the balanced position Cac becomes the boundary between the radar images Pa and Pc, the balanced position Cad becomes the boundary between the radar images Pa and Pd, the balanced position Ccd becomes the boundary between the radar images Pc and Pd, the balanced position Cbc becomes the boundary between the radar images Pb and Pc, and the balanced position Cbd becomes the boundary between the radar images Pb and Pd.

For example, the generator 12 may generate the synthesized image XP3 including the icon Ia indicative of the installed location of the radar 20A, the icon Ib indicative of the installed location of the radar 20B, the icon Ic indicative of the installed location of the radar 20C, the icon Id indicative of the installed location of the radar 20D, the icon Iz indicative of the position of the bridge of the ship 1, an icon Iacd indicative of the position of the circumcenter Eacd, an icon Ibcd indicative of the position of the circumcenter Ebcd, and the borderlines BL31, BL32, BL33, BL34, and BL35. The generator 12 may output image information indicative of the generated synthesized image XP3 to the display processor 13.

The display processor 13 may perform, in response to the image information from the generator 12, processing of displaying the synthesized image XP3 indicated by the image information received from the generator 12 on the display unit 201.

[Flow of Operation]

Each device in the multi-radar system according to the embodiment of the present disclosure may be provided with a computer including a memory, and an arithmetic processor, such as a CPU, in this computer may read a program including some or all of each step of the following flowchart and the sequence from the memory, and execute the program. The programs of the plurality of devices may be installable from outside the system. These programs may be circulated in a state where it is stored in a recording medium, or via a communication line or network.

Figure 11:
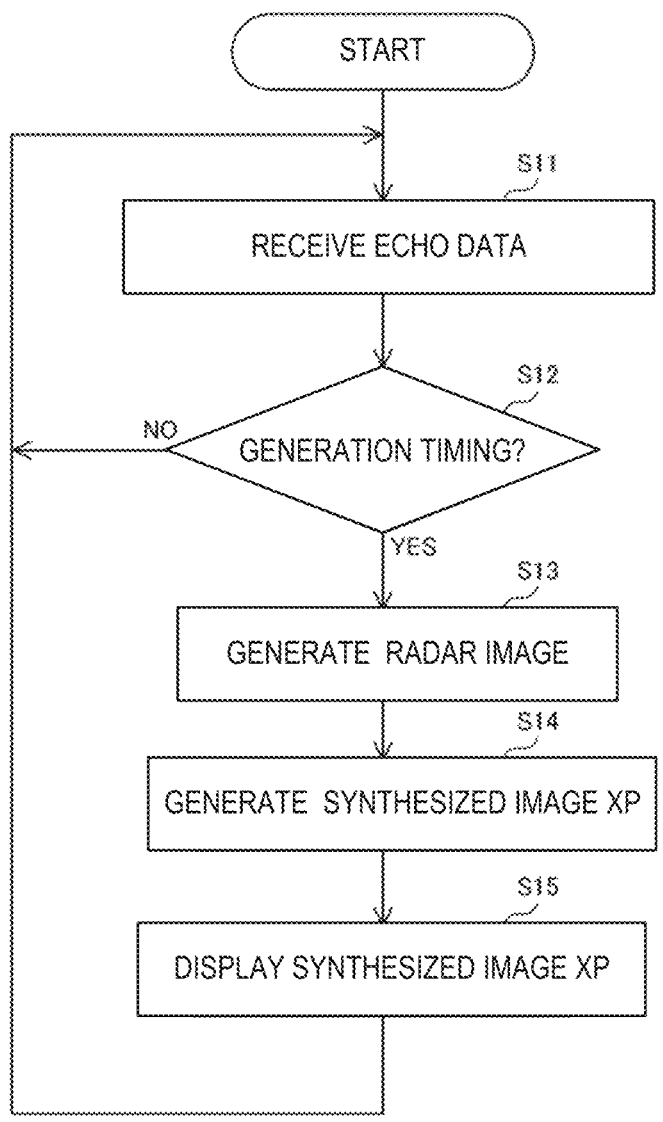
FIG. 11 is a flowchart defining one example of an operation procedure when the radar image synthesizing device according to the embodiment of the present disclosure displays the synthesized image.

FIG. 11 is a flowchart defining one example of operation procedure when the radar image synthesizing device according to the embodiment of the present disclosure displays the synthesized image.

Referring to FIG. 11, first, the radar image synthesizing device 101 may receive echo data from the radar 20 in the multi-radar system 301, and store the received echo data in the memory 15 (Step S11).

Next, the radar image synthesizing device 101 may await the generation timing according to the given generation cycle (NO at Step S12), and repeat the receiving and storing of echo data (Step S11) until the generation timing comes. If the generation timing comes (YES at Step S12), the radar image synthesizing device 101 may acquire each echo data from the memory 15, and generate the radar image based on each acquired echo data (Step S13).

Next, the radar image synthesizing device 101 may generate, by using the plurality of generated radar images, the synthesized image in which the radar images are synthesized so that the balanced position becomes the boundary between the radar images. In more detail, for example, the radar image synthesizing device 101 may acquire the calculation information from the memory 15, and synthesize the radar images so that the balanced position indicated by the calculation information becomes the boundary between the radar images to generate the synthesized image XP (Step S14).

Next, the radar image synthesizing device 101 may perform processing of displaying the generated synthesized image XP on the display unit 201 (Step S15).

Next, the radar image synthesizing device 101 may await a new generation timing (NO at Step S12), and repeat the receiving and storing of echo data (Step S11) until the new generation timing comes.

Figure 12:
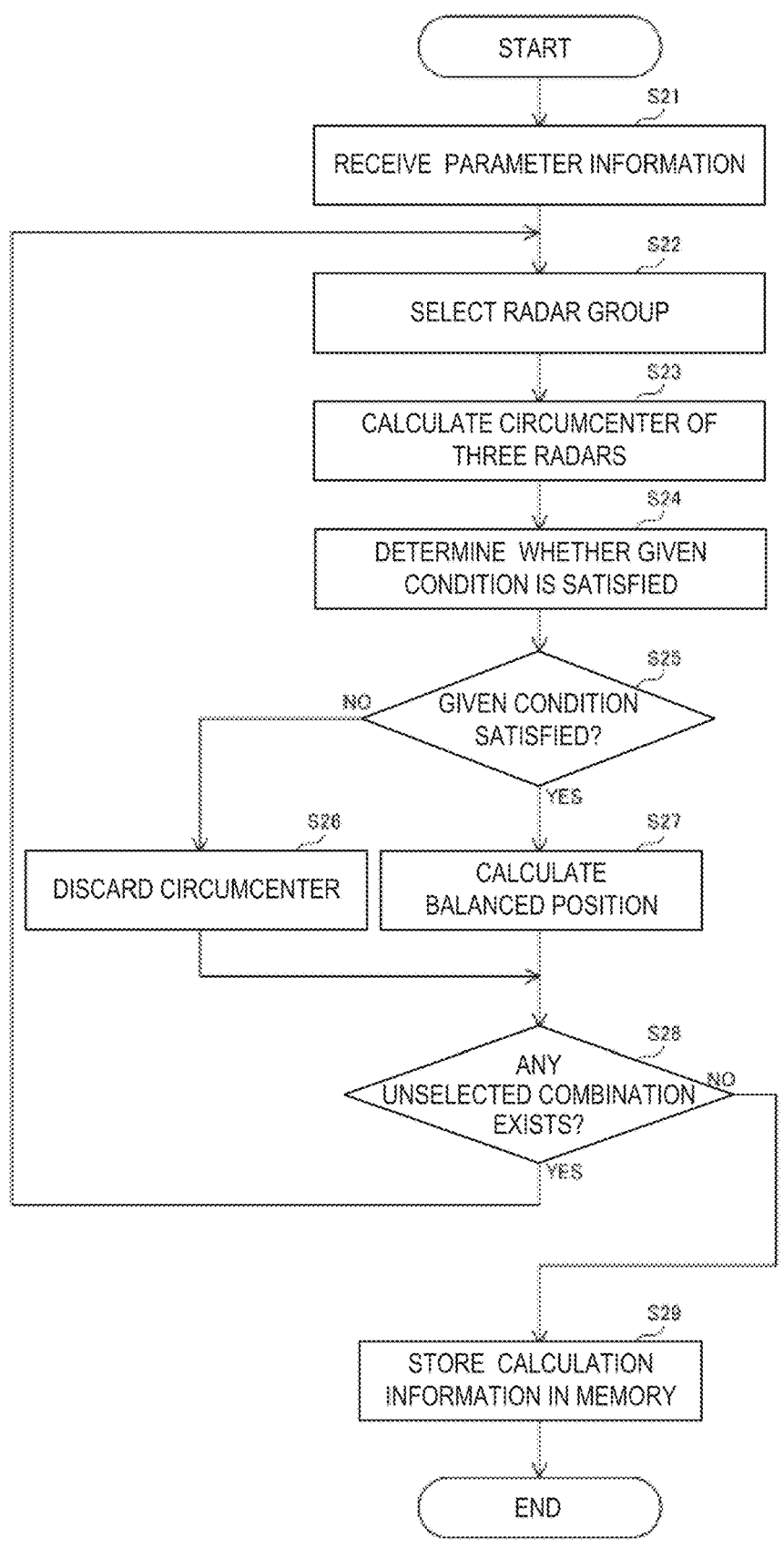
FIG. 12 is a flowchart defining one example of an operation procedure when the radar image synthesizing device according to the embodiment of the present disclosure calculates a balanced position.

FIG. 12 is a flowchart defining one example of operation procedure when the radar image synthesizing device according to the embodiment of the present disclosure calculates the balanced position. FIG. 12 is a flowchart when the radar image synthesizing device 101 in the multi-radar system 302 according to the modification described above calculates a plurality of balanced positions.

Referring to FIG. 12, first, the radar image synthesizing device 101 may receive the parameter information indicative of the position of each radar 20 in the multi-radar system 302, and the beam width of each radar 20 (Step S21).

Next, the radar image synthesizing device 101 may select a radar group which is comprised of three arbitrary radars 20 among the four radars 20 in the multi-radar system 302 (Step S22).

Next, the radar image synthesizing device 101 may calculate the equidistant point (i.e., the circumcenter) of the three radars 20 which constitute the selected radar group (Step S23).

Next, the radar image synthesizing device 101 may determine whether the calculated circumcenter satisfies the given condition. In detail, the radar image synthesizing device 101 may determine whether the given condition that the radar 20 nearest to the circumcenter among the four radars 20 in the multi-radar system 302 is the radar 20 which constitutes the selected radar group is satisfied (Step S24).

Next, if the calculated circumcenter does not satisfy the given condition (NO at Step S25), the radar image synthesizing device 101 may discard the calculated circumcenter (Step S26).

On the other hand, if the calculated circumcenter satisfies the given condition (YES at Step S25), the radar image synthesizing device 101 may calculate the balanced position of the radars 20, for all three combination pairs of the three radars 20 which constitute the selected radar group (Step S27).

Next, if there is any unselected combination of the radars 20 as the radar group (YES at Step S28), the radar image synthesizing device 101 may select a radar group which is an unselected combination of the radars 20 (Step S22).

On the other hand, if there is no more unselected combination of the radars 20 (NO at Step S28), the radar image synthesizing device 101 may store the calculation information indicative of the circumcenters and the balanced positions which have been calculated so far in the memory 15 (Step S29).

Note that, although in the radar image synthesizing device 101 according to the embodiment of the present disclosure the acquirer 11 receives the echo data from the radar 20 in the multi-radar system 301 and generates the radar image based on the received echo data, it is not limited to this configuration. The acquirer 11 may receive the radar image from the radar 20, instead of receiving the echo data from the radar 20.

Further, although the multi-radar system 302 according to the modification of the embodiment of the present disclosure is provided with the radars 20A, 20B, 20C, and 20D, it is not limited to this configuration. The multi-radar system 302 may be provided with three radars 20, or five or more radars 20.

The above embodiment is illustrative in all aspects, and it should be considered not to be restrictive. The scope of the present disclosure is illustrated not by the above description but by the appended claims, and it is intended to include all the changes within the claims, and the meaning and the scope equivalent to the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1: Ship
11: Acquirer
12: Generator
13: Display Processor
14: Accepter
15: Memory
20, 20A, 20B, 20C, 20D: Radar
101: Radar Image Synthesizing Device
201: Display Unit
301, 302: Multi-radar System
BL1, BL2, BL31-BL35, BLc: Borderline
Cab, Cac, Cad, Ccd, Cbc, Cbd: Balanced Position
Eacd, Ebcd: Circumcenter
Ia, Ib, Ic, Id, Iz, Iacd, Ibcd: Icon
L: Radar-to-radar Distance
Pa, Pb, Pc, Pd: Radar Image
S, S1, S2: Target Object
SC: Setup Screen
Ta, Tb, Tc, Td: Transmission Signal
TB1-TB10: Text Box
XP1, XP2, XP3, XPc: Synthesized Image
$\theta a$, $\theta b$, $\theta c$, $\theta d$: Horizontal Beam Width

What is claimed is:

1. A radar image synthesizing device, comprising:
processing circuitry configured to;
acquire a plurality of radar images based on a measuring result of each of a plurality of radars disposed at different locations,
generate a synthesized image in which the plurality of radar images are synthesized, while using a position at which a product of a beam width of the radar and a distance from the radar becomes equal in a set of at least any two radars, as a boundary between the radar images, and
display the synthesized image,
wherein the processing circuitry is further configured to generate the synthesized image by synthesizing radar images which are obtained by removing radar images that are farther than the balanced position.

2. The radar image synthesizing device of claim 1, further comprising an accepter configured to accept parameters indicative of a position of each of the radars, and a beam width of each of the radars.

3. The radar image synthesizing device of claim 1, wherein the processing circuitry displays the synthesized image further including a line of the boundary.

4. The radar image synthesizing device of claim 2, wherein the processing circuitry displays the synthesized image further including a line of the boundary.

5. The radar image synthesizing device of claim 1, wherein the processing circuitry displays the synthesized image further including positional information on each of the radars.

6. The radar image synthesizing device of claim 2, wherein the processing circuitry displays the synthesized image further including positional information on each of the radars.

7. The radar image synthesizing device of claim 3, wherein the processing circuitry displays the synthesized image further including positional information on each of the radars.

8. The radar image synthesizing device of claim 4, wherein the processing circuitry displays the synthesized image further including positional information on each of the radars.

9. The radar image synthesizing device of claim 1, wherein the plurality of radars are mounted on a ship.

10. The radar image synthesizing device of claim 9, wherein the plurality of radars are a radar disposed at the bow side of the ship, and a radar disposed at the stern side of the ship.

11. The radar image synthesizing device of claim 9, wherein the plurality of radars are a radar disposed at the bow side of the ship, a radar disposed at the stern side of the ship, a radar disposed at the port side of the ship, and a radar disposed at the starboard side of the ship.

12. The radar image synthesizing device of claim 11, wherein the set of radars are configured to be included in a plurality of separately controllable groups that include:
a first group that includes the radar disposed at the bow side of the ship, and the radar disposed at the port side of the ship;
a second group that includes the radar disposed at the bow side of the ship, and the radar disposed at the starboard side of the ship;
a third group that includes the radar disposed at the stern side of the ship, and the radar disposed at the port side of the ship;
a fourth group that includes the radar disposed at the stern side of the ship, and the radar disposed at the starboard side of the ship; and
a fifth group that includes the radar disposed at the port side of the ship, and the radar disposed at the starboard side of the ship.

13. The radar image synthesizing device of claim 9, wherein the display processor displays the synthesized image centering on a position of a bridge of the ship.

14. A radar image synthesizing method, comprising the steps of:
acquiring a plurality of radar images indicative of a measuring result of each of a plurality of radars disposed at different locations;
generating a synthesized image in which the plurality of radar images are synthesized, while using a position at which a product of a beam width of the radar and a distance from the radar becomes equal in a set of at least any two radars, as a boundary between the radar images; and
displaying the synthesized image,
wherein the radar image synthesizing method further comprises generating the synthesized image by synthesizing radar images which are obtained by removing radar images that are farther than the balanced position.

15. A non-transitory computer-readable recording medium storing a program for causing a computer to execute processing, the processing comprising:

acquiring a plurality of radar images based on a measuring result of each of a plurality of radars disposed at different locations;

generating a synthesized image in which the plurality of radar images are synthesized, while using a position at which a product of a beam width of the radar and a distance from the radar becomes equal in a set of at least any two radars, as a boundary between the radar images; and displaying the synthesized image, wherein the processing further comprises generating the synthesized image by synthesizing radar images which are obtained by removing radar images that are farther than the balanced position.

* * * * *